J. HAUCK.
NUT LOCK.
APPLICATION FILED JULY 14, 1908.
920,055.
Patented Apr. 27, 1909.
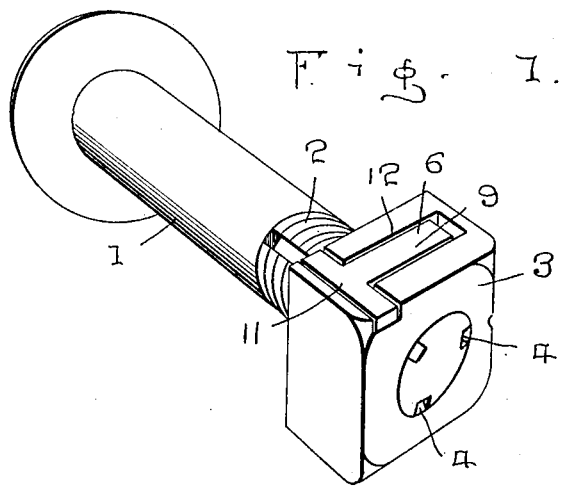
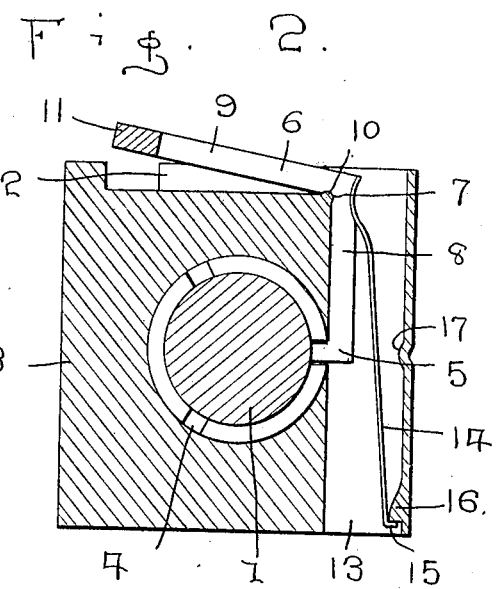
WITNESSES:
Thos. W. Riley
E. H. Gill
INVENTOR
J. Hauck
BY
W. J. FitzGerald
Attorneys

UNITED STATES PATENT OFFICE.

JACOB HAUCK, OF RONDO, NORTH DAKOTA, ASSIGNOR OF ONE-HALF TO EUGENE WEIGEL, OF HEBRON, NORTH DAKOTA.

NUT-LOCK.

No. 920,055.  Specification of Letters Patent.  Patented April 27, 1909.

Application filed July 14, 1908. Serial No. 443,481.

*To all whom it may concern:*

Be it known that I, JACOB HAUCK, a citizen of the United States, residing at Rondo, North Dakota, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut locks and my object is to provide means for locking the nut in its adjusted position on a bolt.

A further object is to provide means for yieldingly holding the locking device into engagement with the bolt.

A further object is to provide a suitable fulcrum or pivotal point for the locking device and a further object is to provide means whereby when a wrench is applied to the nut, the locking device will be held out of engagement with the bolt, while the nut is being turned.

Other objects and advantages will be hereinafter referred to and more particularly pointed out in the claims.

In the accompanying drawings which are made a part of this application, Figure 1 is a perspective view of a nut and bolt showing my improved locking device attached thereto, and, Fig. 2 is a transverse sectional view through the nut and bolt showing my improved locking device in its locked position.

Referring to the drawings in which similar reference numerals designate corresponding parts throughout the several views, 1 indicates a bolt, which may be of the usual or any preferred construction, one portion of said bolt being provided with threads 2, with which is adapted to coöperate an interiorly threaded nut 3. In order to securely lock the nut on the bolt 1, the threaded portion thereof is provided with a plurality of longitudinally extending grooves 4, with which is adapted to engage a finger 5, on one end of an L-shaped locking lever 6, said lever being provided with a curved seat 7 at the intersection of the two members 8 and 9 of the locking lever, into which is adapted to take a similarly curved projection 10 on the nut 3, said projection forming a pivotal point for the locking lever, whereby said lever may be rocked to move the finger 5 out of engagement with the grooves 4.

The member 9 is provided at its free end with a cross head 11, said member 9 and cross head 11 being substantially T-shaped and are adapted to rest in a T-shaped recess 12, on one face of the nut, the depth of the recess being such that when a wrench is applied to the nut, the member 9 and cross head thereon will move into the recess and remain flush with the face of the nut and by arranging the member 9 at an obtuse angle to the member 8, the cross head 11 will be supported in a plane above the face of the nut when the finger 5 is engaged with one of the grooves 4.

Extending through the nut 3 at a tangent to the threaded opening in the nut is a channel 13, in which rests the member 8, the inner wall of the channel having an opening therein through which the finger 5 extends to enter the grooves 4 and in order to yieldingly hold the finger in engagement with the grooves 4, a spring 14 is secured at one end to the locking lever 6, while the opposite end of said spring is provided with an extension 15, which extension engages a rib 16 on the outer wall of the channel 13. By this construction it will be readily seen that when a wrench is applied to the nut and the member 9 and cross head thereon, moved into the recess 12, the member 8 will be swung outwardly and the member 5 disengaged from the grooves 4 when the nut may be turned in either direction as desired and it will likewise be seen that as soon as the wrench is removed from the nut, the tension of the spring 14 will immediately move the finger 5 inwardly and seat the same in one of the grooves 4, as soon as the nut is turned to such a position as to register the finger with one of the grooves.

That portion of the nut forming the outer wall of the channel 13 is preferably curved inwardly at a point adjacent its longitudinal center or immediately in the rear of the finger 5 to form a shoulder 17, against which the spring 14 will bind when the finger 5 is moved out of the groove 4 and as the spring is held against the shoulder with considerable pressure, the inward tension of the spring will be increased, thereby causing the spring to quickly move the finger 5 inwardly when the cross head 11 and member carrying the same are released.

If, for any reason, the locking lever is to be removed, the extension 15 is disengaged from the rib 16 and the finger 5 swung out of engagement with the opening in the inner wall of the channel 13, when the locking lever may be moved outwardly and entirely disengaged from the nut.

It will thus be seen that I have provided a positive lock for the nut and one wherein the locking finger may be held out of its locked position at such time as the nut is being introduced onto or removed from the bolt and it will likewise be seen that by providing the spring and arranging the same as shown, the locking lever will be normally held in its locked position.

What I claim is:

1. In a nut lock, the combination with a bolt having threads therearound and longitudinally extending grooves in the periphery of the bolt; of a nut having a recess in one face thereof and a channel extending through the nut, a curved projection at the intersection of the recess and channel, a locking lever formed of members and having a curved seat at the juncture of said members adapted to engage said projection, a cross head at one end of one of said members, a finger at one end of the opposite member, a spring fixed at one end to said locking lever to anchor the opposite end of said spring, whereby said spring will exert pressure on the locking lever, and additional means to engage the spring and increase the tension thereof when the locking lever is in its unlocked position.

2. In a nut lock, the combination with a bolt having threads thereon and grooves in the periphery of said bolt; of a nut adapted to coöperate with the threaded portion of said bolt, said nut having a recess in one face thereof and a channel extending therethrough, a curved projection at the intersection of said channel and recess, a locking lever having a curved seat adapted to engage said projection and form a bearing for the lever, a finger on said lever adapted to engage grooves in the bolt and lock the nut in position thereon, a spring having one of its ends fixed to the lever adjacent its pivot point, means to anchor the opposite end of said spring and a shoulder adapted to be engaged by the spring when the lever is in its unlocked position and increase the tension of said spring.

In testimony whereof I have signed my name to this specification in the presence of two subscribing witnesses.

JACOB HAUCK.

Witnesses:
 EUGENE WEIGEL,
 IRA INGRAHAM.